(12) United States Patent
Li et al.

(10) Patent No.: US 11,681,006 B2
(45) Date of Patent: Jun. 20, 2023

(54) METHOD FOR JOINTLY ESTIMATING GAIN-PHASE ERROR AND DIRECTION OF ARRIVAL (DOA) BASED ON UNMANNED AERIAL VEHICLE (UAV) ARRAY

(71) Applicant: Nanjing University of Aeronautics and Astronautics, Nanjing (CN)

(72) Inventors: Jianfeng Li, Nanjing (CN); Qiting Zhang, Nanjing (CN); Benzhou Jin, Nanjing (CN); Xiaofei Zhang, Nanjing (CN); Qihui Wu, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/882,636

(22) Filed: Aug. 8, 2022

(65) Prior Publication Data

US 2023/0160991 A1 May 25, 2023

(30) Foreign Application Priority Data

Nov. 24, 2021 (CN) .......................... 202111398473.8

(51) Int. Cl.
*G01S 3/14* (2006.01)
*G01S 3/02* (2006.01)

(52) U.S. Cl.
CPC .............. *G01S 3/143* (2013.01); *G01S 3/023* (2013.01)

(58) Field of Classification Search
CPC . G01S 3/143; G01S 3/023; G01S 3/14; G01S 3/06; G01S 3/74; G01S 3/46
See application file for complete search history.

(56) References Cited

U.S. PATENT DOCUMENTS 9,797,978 B1 * 10/2017 Melamed .................. G01S 3/14

FOREIGN PATENT DOCUMENTS

| CN | 104749554 A | 7/2015 |
|----|-------------|--------|
| CN | 107064892 A | 8/2017 |

(Continued)

OTHER PUBLICATIONS

Haynes, Tony, "A Primer on Digital Beamforming", Spectrum Signal Processing, Mar. 26, 1998 (Year: 1998).*

(Continued)

*Primary Examiner* — Cassi J Galt
(74) *Attorney, Agent, or Firm* — Bayramoglu Law Offices LLC (57) ABSTRACT

A method for jointly estimating gain-phase error and direction of arrival (DOA) based on an unmanned aerial vehicle (UAV) array includes: equipping each UAV with an antenna, and forming a receive array through a swarm of multiple UAVs to receive source signals; when an observation baseline of the swarm remains unchanged, changing array manifold through movement of the UAVs, and re-sensing the source signals; for each sensed source signals, calculating a covariance matrix, and obtaining a corresponding noise subspace through eigenvalue decomposition; and constructing a quadratic optimization problem based on the noise subspace and array steering vector, constructing a cost function, and implementing joint estimation of the gain-phase error and the DOA through spectrum peak search. The method can jointly estimate the DOA and gain-phase error and calibrate the gain-phase error, thereby improving accuracy of passive positioning.

2 Claims, 4 Drawing Sheets

(56) References Cited

FOREIGN PATENT DOCUMENTS

| CN | 108375752 A | | 8/2018 |
|---|---|---|---|
| CN | 110515038 A | * | 11/2019 |
| CN | 111965595 A | | 11/2020 |
| WO | WO-2019200153 A1 | * | 10/2019 |

OTHER PUBLICATIONS

Chen, Zhong et. al., "A Sensor-Driven Analysis of Distributed Direction Finding Systems Based on UAV Swarms", Sensors19.12 MDPI AG. (Feb. 2019) (Year: 2019).*

Qiting Zhang, et al., DOA Estimation Using Non-uniform Sparse Array with Unknown Mutual Coupling, 2021 2nd Information Communication Technologies Conference, 2021, pp. 6-10.

Hou Qing-Song, et al., Robust Direction Finding and Position Errors Calibration for Conformal Array Antenna in the Presence of Vibration, Signal Processing, 2010, pp. 1756-1760, vol. 26, No. 11.

Lu Zukun, et al., Self Correction Algorithm of Amplitude Phase Error Based on the Subspace, Modern Navigation, 2013, pp. 298-302.

Houhong Xiang, et al., A Novel Phase Enhancement Method for Low-Angle Estimation Based on Supervised DNN Learning, IEEE Access, 2019, pp. 82329-82336, vol. 7.

* cited by examiner

METHOD FOR JOINTLY ESTIMATING GAIN-PHASE ERROR AND DIRECTION OF ARRIVAL (DOA) BASED ON UNMANNED AERIAL VEHICLE (UAV) ARRAY

CROSS REFERENCE TO THE RELATED APPLICATIONS

This application is based upon and claims priority to Chinese Patent Application No. 202111398473.8, filed on Nov. 24, 2021, the entire contents of which are incorporated herein by reference.

TECHNICAL FIELD

The present disclosure relates to the technical field of array signal processing, and specifically, to a method for jointly estimating a gain-phase error and a direction of arrival (DOA) based on an unmanned aerial vehicle (UAV) array.

BACKGROUND

As an important branch of modern signal processing, array signal processing has seen a rapid development in recent decades, and has been widely used in military and civilian fields such as radar, sonar, and wireless communications. DOA estimation is one of the key technologies of array signal processing, and is mainly used to estimate a position of a spatial source. The DOA estimation technology is developing rapidly, but related theories and technologies are still being improved.

Ubiquitous array errors make it difficult to apply a spatial spectrum estimation technology to practical projects. Normally, almost all DOA estimation algorithms are based on an accurately known array manifold. To obtain a good algorithm estimation effect, it is necessary to ensure that an actually used array is totally consistent with a standard array model in theoretical research. However, in practical applications, device or actual environment factors may cause errors in the array. When an ideal array manifold is used for estimating actual DOA, it is inevitable that an obtained estimation result has a relatively large error or the estimation result is totally invalid. Most of the array errors can ultimately be attributed to array gain-phase errors. Therefore, it is essential to study a DOA estimation algorithm in the presence of array gain-phase errors for application of the spatial spectrum estimation technology.

SUMMARY

In view of the defects in the prior art, the present disclosure provides a method for jointly estimating a gain-phase error and a DOA based on a UAV array, to implement position change of an array based on a UAV swarm, jointly estimate a DOA and a gain-phase error, and calibrate the gain-phase error, thereby improving accuracy of passive positioning.

To achieve the above objective, the present disclosure adopts the following technical solution:

A method for jointly estimating a gain-phase error and a DOA based on a UAV array includes the following steps:

S1: equipping each UAV with an antenna, and forming a receive array through a swarm of multiple UAVs to receive source signals;

S2: when an observation baseline of the swarm remains unchanged, changing array manifold through movement of the UAVs, and re-sensing the source signals;

S3: for each sensed source signals, calculating a covariance matrix, and obtaining a corresponding noise subspace through eigenvalue decomposition; and S4: constructing a quadratic optimization problem based on the noise subspace and array steering vector, constructing a cost function, and implementing joint estimation of a gain-phase error and a DOA through spectrum peak search.

In order to optimize the technical solution, the following specific measures are also used.

Further, in S1, a process of equipping each UAV with the antenna, and forming the receive array through the swarm of multiple UAVs to receive the source signals includes the following steps:

S11: enabling M UAVs to be evenly arranged, and equipping each UAV with the antenna, where a distance between array elements is a unit distance $d=\lambda/2$, $\lambda$ represents a wavelength, and M is a positive integer greater than 2; and S12: assuming that K parallel plane waves are incident from a direction $\theta_k$, where $k=1, 2, \ldots, K$, K is a positive integer greater than 2, and when the array has a gain-phase error, a signal received by the array in an initial state is expressed as:

$$x_1(t)=CA_1s(t)+n(t)$$

where $C=\text{diag}(c)=\text{diag}(c_1, c_2, \ldots, c_M)$ is a gain-phase error diagonal matrix, where $\text{diag}(c)$ is a diagonal matrix formed by elements in a vector $c$; $s(t)=[s_1(t), s_2(t), \ldots, s_K(t)]^T$ is a signal vector, $n(t)$ is additive white Gaussian noise, $A_1=[a_1(\theta_1), a_1(\theta_2), \ldots, a_1(\theta_K)]$ is a direction matrix, and $a_1(\theta_k)$ is an array steering vector in the direction $\theta_k$ and is expressed as:

$$a_1(\theta k)=[e^{-j\pi d_{11}\sin\theta_k}, e^{-j\pi d_{12}\sin\theta_k}, \ldots, e^{-j\pi d_{1M}\sin\theta_k}]^T$$

where $d_{11}, d_{12}, \ldots, d_{1M}$ represent respective position information of the M UAVs in the initial state.

Further, in step S3, a process of calculating, for each sensed source signals, the covariance matrix, and obtaining the corresponding noise subspace through eigenvalue decomposition includes the following steps:

S21: when the baseline remains unchanged, changing a position of the corresponding array element through movement of the UAVs, to form a new array, and sensing a corresponding source signal for the newly formed array;

S22: for the i-th sensed source signal $x_i(t)$, calculating a covariance matrix according to the following formula:

$$R_i = E[x_i(t)x_i^H(t)] = \frac{1}{L}\sum_{l=1}^{L}x_i(t_l)x_i^H(t_l)$$

where L represents the number of data snapshots; $E(\cdot)$ represents expectation; $(\cdot)^H$ represents a conjugate transpose operation; and $t_l$ represents the l-th snapshot; and S23: performing eigen decomposition on $R_i$ to implement eigenvalue decomposition for the covariance matrix, which is expressed as:

$$R_i=U_{S_i}D_{S_i}U_{S_i}^H+U_{N_i}D_{N_i}U_{N_i}^H$$

where $D_{S_i}$ represents a K×K-dimension diagonal array, of which diagonal elements include K larger eigenvalues obtained through the eigenvalue decomposition, and $D_{N_i}$ is a diagonal array of M−K smaller eigenvalues; $U_{S_i}$ is a matrix of eigenvectors corresponding to the K larger eigenvalues, and $U_{N_i}$ is a matrix of eigenvectors corresponding to other eigenvalues; $U_{S_i}$ and $U_{N_i}$ are called signal subspace and noise subspace, respectively; and i=1, 2, ..., p, where p is the total number of observations.

Further, in step S4, a process of constructing the quadratic optimization problem based on the noise subspace and the array steering vector, constructing the cost function, and implementing joint estimation of the gain-phase error and the DOA through spectrum peak search includes the following steps:

S41: constructing the quadratic optimization problem:

$$\min_\theta c^H Q(\theta)c, \text{ s.t. } e_1^H c = 1$$

where $c=[c_1, c_2, \ldots, c_M]$ represents the gain-phase error, $e_1=[1, 0, \ldots, 0]^T$, $(\cdot)^T$ represents a transpose operation, and $\theta$ represents a to-be-estimated DOA parameter;

$$Q(\theta) = \begin{bmatrix} U_{N_1}^H \text{diag}(a_1(\theta)) \\ \vdots \\ U_{N_P}^H \text{diag}(a_P(\theta)) \end{bmatrix}^H \begin{bmatrix} U_{N_1}^H \text{diag}(a_1(\theta)) \\ \vdots \\ U_{N_P}^H \text{diag}(a_P(\theta)) \end{bmatrix}$$

where $a_i(\theta)$ represents a steering vector at the i-th observation, $\text{diag}(a_i(\theta))$ represents a diagonal matrix formed by elements in a vector $a_i(\theta)$, and i=1, 2, ..., p;

S42: constructing the cost function:

$$L(\theta,c) = c^H Q(\theta)c - \varepsilon(e_1^H c - 1)$$

where $\varepsilon$ is a constant;

S43: finding a partial derivative of $L(\theta,c)$:

$$\partial L(\theta,c)/\partial c = 2Q(\theta)c - \varepsilon e_1 = 0$$

where $c = \xi Q^{-1}(\theta)e_1$, and $\xi$ is a constant;

S44: obtaining estimated angle and gain-phase error values:

$$\hat{c} = \frac{Q^{-1}(\theta)e_1}{e_1^H Q^{-1}(\theta)e_1}; \text{ and}$$

S45: substituting the expression of $\hat{c}$ into $\min_\theta c^H Q(\theta)c$, and calculating an estimated DOA value:

$$\hat{\theta} = \arg\min_\theta \frac{1}{e_1^H Q^{-1}(\theta)e_1} = \arg\max_\theta e_1^H Q^{-1}(\theta)e_1.$$

Further, the method further includes the following steps: using a root mean square error (RMSE) as a performance estimation indicator to evaluate validity of the estimation results; and calculating the corresponding RMSE according to the following formulas:

$$\text{RMSE}_\theta = \sqrt{\frac{1}{NK}\sum_{n=1}^{N}\sum_{k=1}^{K}(\theta_k - \hat{\theta}_{k,n})^2}$$

$$\text{RMSE}_c = \sqrt{\frac{1}{MN}\sum_{n=1}^{N}\sum_{m=1}^{M}(c_m - \hat{c}_{m,n})^2}$$

where N represents the number of Monte Carlo simulations, $\theta_k$ represents a real incident angle of the k-th signal, $\hat{\theta}_{k,n}$ represents an estimated angle value of the k-th signal in the n-th simulation experiment, $c_m$ represents a real value of the m-th gain-phase error coefficient, and $\hat{c}_{m,n}$ represents an estimated value of the m-th gain-phase error coefficient in the n-th simulation experiment.

The present disclosure has the following beneficial effects:

Compared with the prior art, the present disclosure breaks through the limitations of DOA estimation on a gain-phase error in the prior art, and can obtain an accurate estimated angle value, and achieve more accurate positioning. In the presence of a gain-phase error, the present disclosure can estimate and calibrate the gain-phase error value without requiring auxiliary calibration sources, auxiliary calibration array elements, or iterative solutions, and can achieve high-resolution estimation.

DETAILED DESCRIPTION OF THE EMBODIMENTS

The present disclosure is described in further detail below with reference to the accompanying drawings.

It should be noted that, as used herein, terms such as "upper", "lower", "left", "right", "front" and "back" are merely employed for ease of a description, and not intended to limit the implementable scope of the present disclosure, and a change or adjustment of its relative relation shall also be deemed as falling within the implementable scope of the present disclosure without a substantial alteration of a technical content.

For ease of description, the meanings of symbols in the embodiments are as follows: $E(\cdot)$ represents expectation, $(\cdot)^H$ represents a conjugate transpose operation, $(\cdot)^T$ represents a transpose operation, and $\text{diag}(a)$ represents a diagonal matrix formed by elements in a vector a.

Figure 1:
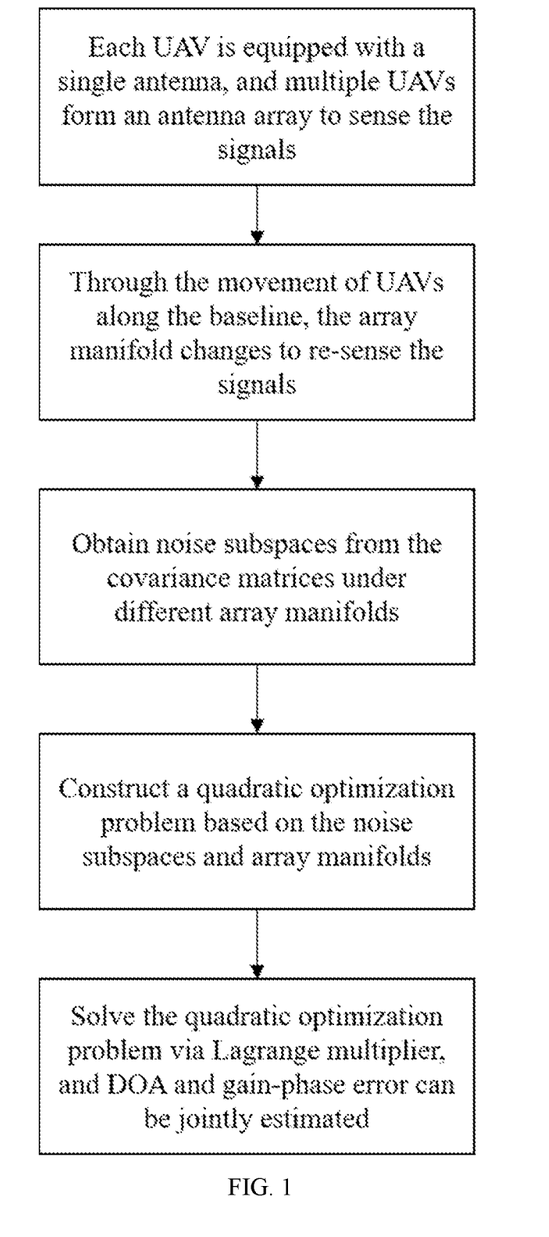
FIG. 1 is a flowchart of a method for jointly estimating a gain-phase error and a DOA based on a UAV array according to the present disclosure.

FIG. 1 is a flowchart of a method for jointly estimating a gain-phase error and a DOA based on a UAV array according to the present disclosure. In this method, multiple UAVs are used as platforms to carry array elements, and multiple array elements form an array to receive signals. The method includes the following steps:

S1: equipping each UAV with an antenna, and forming a receive array through a swarm of multiple UAVs to receive source signals;

S2: when an observation baseline of the swarm remains unchanged, changing array manifold through movement of the UAVs, and re-sensing the source signals;

S3: for each sensed source signals, calculating a covariance matrix, and obtaining a corresponding noise subspace through eigenvalue decomposition; and S4: constructing a quadratic optimization problem based on the noise subspace and array steering vector, constructing a cost function, and implementing joint estimation of a gain-phase error and a DOA through spectrum peak search.

Specific implementation steps are as follows:

Step 1: Receiving a Signal

Enable M UAVs to be evenly arranged, and equip each UAV with an antenna, where a distance between array elements is a unit distance $d=\lambda/2$, and $\lambda$ represents a wavelength. Assume that K parallel plane waves are incident from $\theta_k$ (k=1, 2, ..., K). When the array has a gain-phase error, a signal received by the array may be expressed as:

$$x_1(t)=CA_1s(t)+n(t)$$

where $C=\text{diag}(c)=\text{diag}(c_1, c_2, ..., c_M)$ is a gain-phase error diagonal matrix, $s(t)=[s_1(t), s_2(t), ..., s_K(t)]^T$ is a signal vector, n(t) is additive white Gaussian noise, $A_1=[a_1(\theta_1), a_1(\theta_2), ..., a_1(\theta_K)]$ is a direction matrix, and $a_1(\theta_k)$ is an array steering vector in the direction $\theta_k$ and is expressed as:

$$a_1(\theta k)=[e^{-j\pi d_{11}\sin\theta_k}, e^{-j\pi d_{12}\sin\theta_k}, ..., e^{-j\pi d_{1M}\sin\theta_k}]^T$$

where $d_{11}, d_{12}, ..., d_{1M}$ represents current positions of the UAVs.

According to a data model, information of the received signal may be obtained. Calculate a covariance matrix, which may be expressed as:

$$R_1 = E[x_1(t)x_1^H(t)] = \frac{1}{L}\sum_{l=1}^{L}x_1(t_l)x_1^H(t_l)$$

where L represents the number of data snapshots. Perform eigen decomposition on $R_1$ to implement eigenvalue decomposition for the covariance matrix, which may be expressed as:

$$R_1=U_{S_1}D_{S_1}U_{S_1}^H+U_{N_1}D_{N_1}U_{N_1}^H$$

where $D_{S_1}$ represents a K×K-dimension diagonal array, of which diagonal elements include K larger eigenvalues obtained by the eigenvalue decomposition, and $D_{N_1}$ is a diagonal array of M−K smaller eigenvalues; $U_{S_1}$ is a matrix of eigenvectors corresponding to the K larger eigenvalues, and $U_{N_1}$ is a matrix of eigenvectors corresponding to other eigenvalues; $U_{S_1}$ and $U_{N_1}$ are called signal subspace and noise subspace, respectively.

Step 2: Obtaining Multiple Noise Subspaces

When the baseline remains unchanged (that is, an angle of incidence of signals remains unchanged), change a position of the corresponding array element through movement of the UAVs, to form a new array. In this case, re-receive a signal and perform the same processing, to obtain a noise subspace $U_{N_2}$. Control the UAVs to go on moving, to form a new array, and obtain a noise subspace $U_{N_p}$ at the p-th observation, assuming that a total of P observations are made.

Step 3: Jointly Estimating a DOA and a Gain-Phase Error

When there is a gain-phase error, the MUSIC function changes to:

$$U_{N_1}^H\text{diag}(a_1(\theta_k)c=0$$

$$U_{N_2}^H\text{diag}(a_2(\theta_k)c=0$$

$$U_{N_P}^H\text{diag}(a_P(\theta_k))c=0$$

where $c=[c_1, c_2, ..., c_M]$ is the gain-phase error. Let $$Q(\theta) = \begin{bmatrix} U_{N_1}^H\text{diag}(a_1(\theta)) \\ ... \\ U_{N_P}^H\text{diag}(a_P(\theta)) \end{bmatrix}^H \begin{bmatrix} U_{N_1}^H\text{diag}(a_1(\theta)) \\ ... \\ U_{N_P}^H\text{diag}(a_P(\theta)) \end{bmatrix}$$

and construct the quadratic optimization problem:

$$\min_\theta c^HQ(\theta)c, \text{ s.t. } e_1^Hc=1$$

where $e_1=[1, 0, ..., 0]^T$. Construct the cost function:

$$L(\theta,c)=c^HQ(\theta)c-\varepsilon(e_1^Hc-1).$$

Find a partial derivative of $L(\theta,c)$: $\partial L(\theta,c)/\partial c=2Q(\theta)c-\varepsilon e_1=0$, and $c=\xi Q^{-1}(\theta)e_1$, where $\xi$ is a constant. From $e_1^Hc=1$, $\xi=1/e_1^HQ^{-1}(\theta)e_1$ may be obtained. Therefore, an estimated value of c may be obtained:

$$\hat{c} = \frac{Q^{-1}(\theta)e_1}{e_1^HQ^{-1}(\theta)e_1}$$

Substitute the expression of $\hat{c}$ into $\min_\theta c^HQ(\theta)c$. An estimated value of DOA may be expressed as:

$$\hat{\theta} = \arg\min_\theta \frac{1}{e_1^HQ^{-1}(\theta)e_1} = \arg\max_\theta e_1^HQ^{-1}(\theta)e_1.$$

To verify the effectiveness of the algorithm of the present disclosure, MATLAB simulation analysis is made, where an RMSE is used as a performance estimation indicator, which is defined as:

$$\text{RMSE}_\theta = \sqrt{\frac{1}{NK}\sum_{n=1}^{N}\sum_{k=1}^{K}(\theta_k-\hat{\theta}_{k,n})^2}$$

$$\text{RMSE}_c = \sqrt{\frac{1}{MN}\sum_{n=1}^{N}\sum_{m=1}^{M}(c_m-\hat{c}_{m,n})^2}$$

where N represents the number of Monte Carlo simulations, $\theta_k$ represents a real incident angle of the k-th signal, $\hat{\theta}_{k,n}$ represents an estimated angle value of the k-th signal in the n-th simulation experiment, $c_m$ represents a real value of the m-th gain-phase error coefficient, and $\hat{c}_{m,n}$ represents an estimated value of the m-th gain-phase error coefficient in the n-th simulation experiment.

Figure 2:
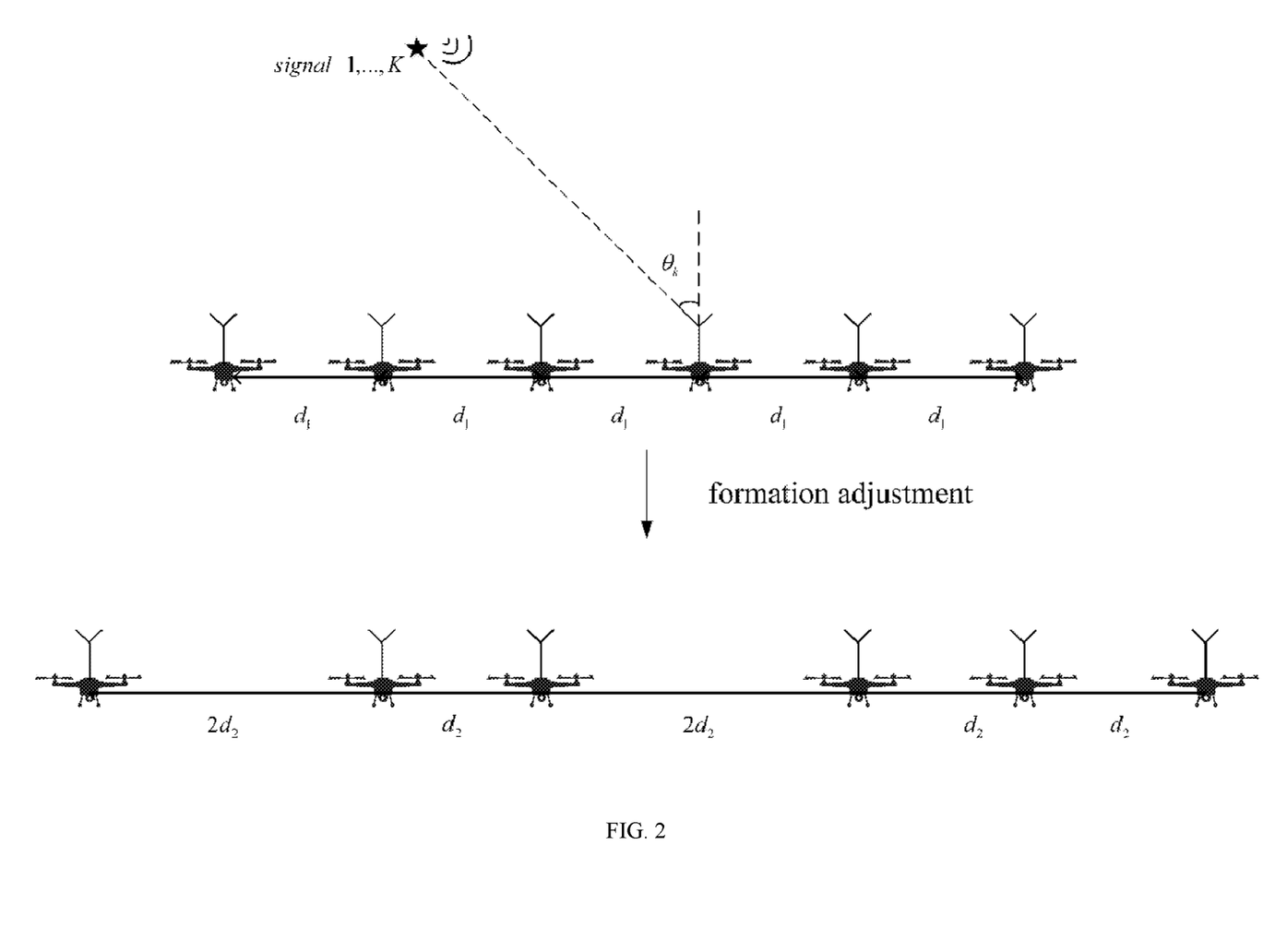
FIG. 2 is a scenario diagram of a receive array formed by a UAV swarm according to the present disclosure.

FIG. 2 is a scenario diagram of the present disclosure. The number of UAVs selected for the simulation is M=6, P=2, $d_1=\lambda/2$, and $d_2=0.35\lambda$, where $\lambda$ represents a wavelength.

Figure 3:
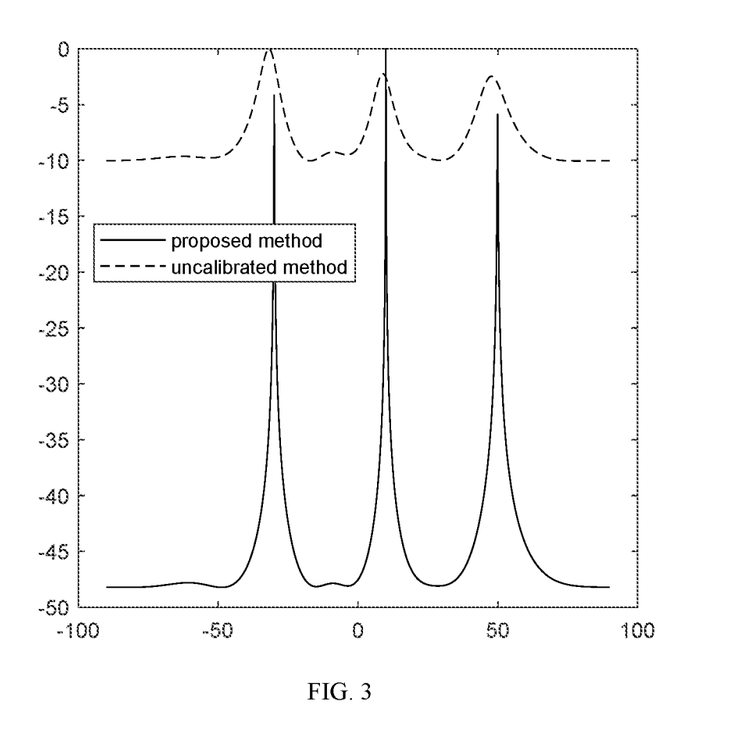
FIG. 3 is a comparison diagram of spectrum peaks with a gain-phase error uncalibrated and calibrated by using the method of the present disclosure.

FIG. 3 is a comparison diagram of spectrum peaks before and after a gain-phase error is calibrated by using the method of the present disclosure. In the simulation, it is assumed that an SNR is 20 dB and the number of snapshots is J=500. It can be seen from the spectrum peak diagram that the gain-phase error affects positions and amplitudes of the spatial spectrum peaks. When there is a gain-phase error, estimation performance of the MUSIC algorithm decreases. If the error is large, the algorithm may even fail.

Figure 4:
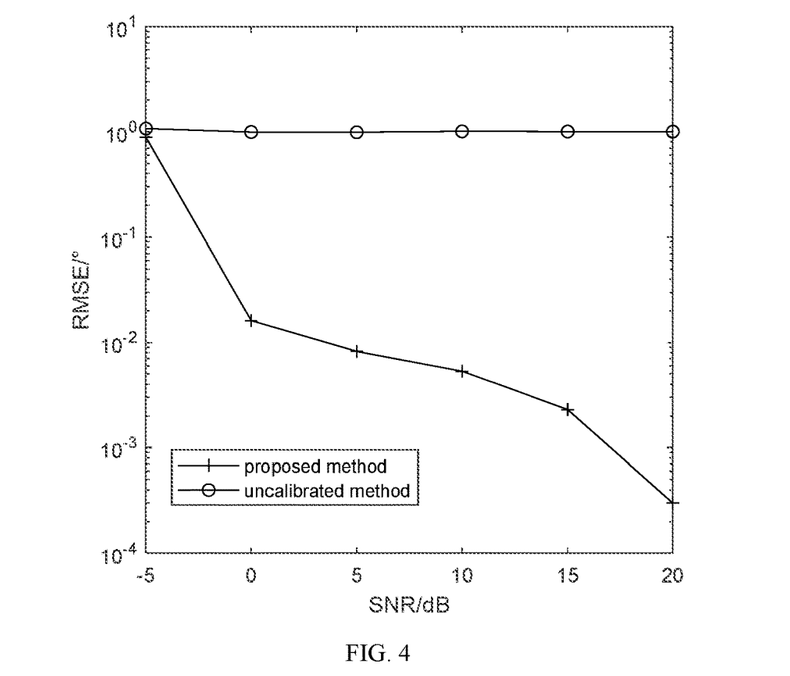
FIG. 4 is a comparison diagram of DOA estimation performance of the present disclosure under different signal-to-noise ratios (SNRs).

FIG. 4 is a comparison diagram of DOA estimation performance of the method proposed in the present disclosure and an uncalibrated method under different SNRs. It can be seen from the simulation results that the method of the present disclosure achieves high estimation accuracy. In addition, the estimation accuracy of the method can be further improved by appropriately increasing the SNR.

Figure 5:
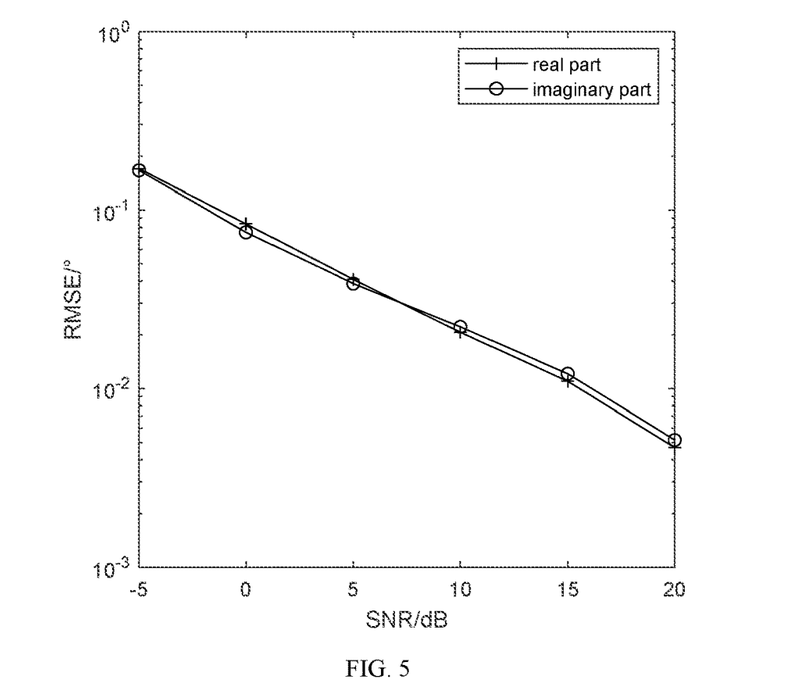
FIG. 5 is a comparison diagram of estimation performance of a real part and an imaginary part of a gain-phase error in the present disclosure in under different SNRs.

FIG. 5 is a diagram of gain-phase error estimation performance of the method in the present disclosure under different SNRs. It can be seen from the simulation results that the method of the present disclosure can accurately estimate the real part and the imaginary part.

The present disclosure provides a method for jointly estimating a gain-phase error and a DOA based on an UAV array, relating to the technical field of array signal processing. According to the present disclosure, each UAV is equipped with an antenna, and a swarm of multiple UAVs form a receive array. By changing positions of the individual UAVs in the swarm, positions of the corresponding array elements are also changed, thereby changing an array manifold. For signals sensed by the array in multiple times, covariance matrices are calculated, and eigenvalue decomposition is performed to obtain multiple signal noise subspaces. A quadratic optimization problem is constructed based on the noise subspaces and an array steering vector, a cost function is constructed, and finally, a DOA is determined and a gain-phase error is estimated through spectrum peak search. The present disclosure breaks through the limitation that DOA estimation accuracy in the traditional cooperative sensing of a UAV swarm is limited by a gain-phase error between UAVs, and has important application value because it can implement joint estimation of a DOA and a gain-phase error accurately without requiring auxiliary signal sources, array elements, or iterative solutions.

What is described above is merely the preferred implementation of the present disclosure, the scope of protection of the present disclosure is not limited to the above examples, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

What is claimed is:

1. A method for jointly estimating a gain-phase error for a receive array and a direction of arrival (DOA) of source signals based on an unmanned aerial vehicle (UAV) array, wherein the method comprises the following steps:

S1: equipping each UAV with an antenna, and forming the receive array through a swarm of multiple UAVs to receive the source signals;

S2: when an observation baseline of the swarm remains unchanged, changing array manifold through movement of the UAVs, and sensing the source signals with the moved UAVs;

S3: for each sensed source signal, calculating a covariance matrix, and obtaining a corresponding noise subspace through eigenvalue decomposition;

S4: constructing a quadratic optimization problem based on the noise subspaces and an array steering vector, constructing a cost function, and implementing joint estimation of the gain-phase error and the DOA through spectrum peak search;

wherein in step S1, a process of equipping each UAV with the antenna, and forming the receive array through the swarm of multiple UAVs to receive the source signals comprises the following steps:

S11: enabling M UAVs to be evenly arranged in an initial state, and equipping each UAV with the antenna, wherein a distance between array elements of the receive array is a unit distance $d=\lambda/2$, $\lambda$ represents a wavelength, and M is a positive integer greater than 2; and S12: assuming that K parallel plane waves having the wavelength are incident from a direction $\theta_k$, wherein k=1, 2, . . . , K, K is a positive integer greater than 2, a signal received by the receive array in the initial state is expressed as:

$$x_1(t)=CA_1s(t)+n(t)$$

wherein $C=\text{diag}(c)=\text{diag}(c_1, c_2, \ldots, c_M)$ is a gain-phase error diagonal matrix, wherein diag(c) is a diagonal matrix formed by elements in a vector c; $s(t)=[s_1(t), s_2(t), \ldots, s_K(t)]^T$ is a signal vector, n(t) is additive white Gaussian noise, $A_1=[a_1(\theta_1), a_1(\theta_2), \ldots, a_1(\theta_K)]$ is a direction matrix, and $a_1(\theta_k)$ is an array steering vector in the direction $\theta_k$ and is expressed as:

$$a_1(\theta k)=[e^{-j\pi d_{11}\sin\theta_k}, e^{-j\pi d_{12}\sin\theta_k}, \ldots, e^{-j\pi d_{1M}\sin\theta_k}]^T$$

wherein $d_{11}, d_{12}, \ldots, d_{1M}$ represent respective position information of the M UAVs in the initial state;

wherein step S2 comprises:

S21: when the baseline remains unchanged, changing a position of the corresponding array element through movement of the UAVs, to form a new array, and sensing a corresponding source signal for the new array;

wherein in step S3, a process of calculating, for each sensed source signals, the covariance matrix, and obtaining the corresponding noise subspace through eigenvalue decomposition comprises the following steps:

S22: for an i-th sensed source signal $x_i(t)$, calculating a covariance matrix according to the following formula:

$$R_i = E[x_i(t)x_i^H(t)] = \frac{1}{L}\sum_{l=1}^{L} x_i(t_l)x_i^H(t_l)$$

wherein L represents a number of data samples; E(·) represents expectation; $(\cdot)^H$ represents a conjugate transpose operation; and $t_l$ represents an l-th sample; and S23: performing eigen decomposition on $R_i$ to implement eigenvalue decomposition for the covariance matrix, wherein $R_i$ is expressed as:

$$R_i=U_{S_i}D_{S_i}U_{S_i}^H+U_{N_i}D_{N_i}U_{N_i}^H$$

wherein $D_{S_i}$ represents a K×K-dimension diagonal array, wherein diagonal elements of the K×K-dimension diagonal array comprise K larger eigenvalues obtained through the eigenvalue decomposition, and $D_{N_i}$ is a diagonal array of M−K smaller eigenvalues; $U_{S_i}$ is a matrix of eigenvectors corresponding to the K larger eigenvalues, and $U_{N_i}$ is a matrix of eigenvectors corresponding to other eigenvalues; $U_{S_i}$ and $U_{N_i}$ are called signal subspace and noise subspace, respectively; and i=1, 2, . . . , p, wherein p is a total number of observations of sensed source signals;

wherein in step S4, a process of constructing the quadratic optimization problem based on the noise subspaces and the array steering vector, constructing the cost function, and implementing joint estimation of the gain-phase error and the DOA through spectrum peak search comprises the following steps:

S41: constructing the quadratic optimization problem:
wherein $c=[c_1, c_2, \ldots, c_M]$ represents the gain-phase error, $e_1=[1, 0, \ldots, 0]^T$, $(\cdot)^T$ represents a transpose operation, and $\theta$ represents a to-be-estimated DOA parameter;

$$Q(\theta) = \begin{bmatrix} U_{N_1}^H \text{diag}(a_1(\theta)) \\ \vdots \\ U_{N_P}^H \text{diag}(a_P(\theta)) \end{bmatrix}^H \begin{bmatrix} U_{N_1}^H \text{diag}(a_1(\theta)) \\ \vdots \\ U_{N_P}^H \text{diag}(a_P(\theta)) \end{bmatrix}$$

wherein $a_i(\theta)$ represents a steering vector at an i-th observation, $\text{diag}(a_i(\theta))$ represents a diagonal matrix formed by elements in a vector $a_i(\theta)$, and $i=1, 2, \ldots, p$;
S42: constructing the cost function:
wherein $\varepsilon$ is a constant;
S43: finding a partial derivative of $L(\theta,c)$:
wherein $c=\xi Q^{-1}(\theta)e_1$, and $\xi$ is a constant;
S44: obtaining estimated angle and gain-phase error values:

$$\hat{c} = \frac{Q^{-1}(\theta)e_1}{e_1^H Q^{-1}(\theta)e_1}; \text{ and}$$

S45: substituting an expression of $\hat{c}$ into $\min_\theta c^H Q(\theta)c$, into and calculating an estimated DOA value:

$$\hat{\theta} = \arg\min_\theta \frac{1}{e_1^H Q^{-1}(\theta)e_1} = \arg\max_\theta e_1^H Q^{-1}(\theta)e_1.$$

2. The method for jointly estimating the gain-phase error and the DOA based on the UAV array according to claim 1, wherein the method further comprises the following step:
using a root mean square error (RMSE) as a performance estimation indicator to evaluate validity of estimation results; and calculating a corresponding RMSE according to the following formulas:

$$\text{RMSE}_{E_\theta} = \sqrt{\frac{1}{NK}\sum_{n=1}^{N}\sum_{k=1}^{K}(\theta_k - \hat{\theta}_{k,n})^2}$$

$$\text{RMSE}_{E_c} = \sqrt{\frac{1}{MN}\sum_{n=1}^{N}\sum_{m=1}^{M}(c_m - \hat{c}_{m,n})^2}$$

wherein N represents a number of Monte Carlo simulations, $\theta_k$ represents a real incident angle of a k-th signal, $\hat{\theta}_{k,n}$ represents an estimated angle value of the k-th signal in an n-th simulation experiment, $c_m$ represents a real value of an m-th gain-phase error coefficient, and $\hat{c}_{m,n}$ represents an estimated value of the m-th gain-phase error coefficient in the n-th simulation experiment.

* * * * *